(12) United States Patent
Leiden et al.

(10) Patent No.: US 8,315,521 B2
(45) Date of Patent: Nov. 20, 2012

(54) PEER-TO-PEER VOICE OVER INTERNET PROTOCOL

(75) Inventors: Stevan H. Leiden, Norwood, MA (US);
Ayaskant Rath, Brooklyn, NY (US);
Yong Liu, Brooklyn, NY (US);
Shivendra Panwar, Freehold, NJ (US);
Keith Ross, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 418 days.

(21) Appl. No.: 12/639,572

(22) Filed: Dec. 16, 2009

(65) Prior Publication Data
US 2010/0278534 A1 Nov. 4, 2010

Related U.S. Application Data

(60) Provisional application No. 61/174,805, filed on May 1, 2009.

(51) Int. Cl.
*H04B 10/20* (2006.01)
(52) U.S. Cl. .......................................... 398/67
(58) Field of Classification Search ............ 398/68, 398/71–72, 66–67
See application file for complete search history.

(56) References Cited

U.S. PATENT DOCUMENTS

| | | | | |
|---|---|---|---|---|
| 7,571,458 | B1 * | 8/2009 | Eyal | 725/137 |
| 2006/0177044 | A1 * | 8/2006 | O'Neil et al. | 379/373.02 |
| 2008/0298799 | A1 * | 12/2008 | Takihiro et al. | 398/2 |
| 2009/0268606 | A1 * | 10/2009 | DeLew et al. | 370/216 |
| 2009/0300668 | A1 * | 12/2009 | Campagna et al. | 725/2 |
| 2010/0150138 | A1 * | 6/2010 | Bjorsell et al. | 370/352 |

OTHER PUBLICATIONS

Poikselkä et al., "The IMS IP Multimedia Concepts and Services", Second Edition, John Wiley & Sons, Ltd, 2006, 431 pages.
Camarillo et al., "The 3G IP Multimedia Subsystem (IMS) Merging the Internet and the Cellular Worlds", Second Edition, John Wiley & Sons, Ltd, 2006, 427 pages.
Abrams et al., "FTTP Deployments in the United States and Japan-Equipment Choices and Service Provider Imperatives", Journal of Lightwave Technology, vol. 23, No. 1, Jan. 2005, pp. 236-246.
Rhea et al., "OpenDHT: A Public DHT Service and Its Uses", UC Berkeley and Intel Research, Aug. 21-26, 2005, 12 pages.
Al-Hezmi et al., "Requirements for an IMS-based Quadruple Play Service Architecture", IEEE Network, Mar./Apr. 2007, pp. 28-33.
Rosenberg et al., "SIP: Session initiation Protocol", Network Working Group, RFC3261, Jun. 2002, The Internet Society, 269 pages.
Skype Limited, "Say, "Hi world!"", www.skype.com, 2010, 1 page.

* cited by examiner

*Primary Examiner* — Leslie Pascal

(57) ABSTRACT

An optical network terminal receives, from a user device associated with the optical network terminal, a call to a called party, and checks a table, which may be locally cached in the optical network terminal, for a network location of another optical network terminal associated with the called party. The device also establishes a connection with another user device associated with the other optical network terminal, based on the network location, and exchanges voice data with the other user device associated with the other optical network terminal via the connection.

23 Claims, 13 Drawing Sheets

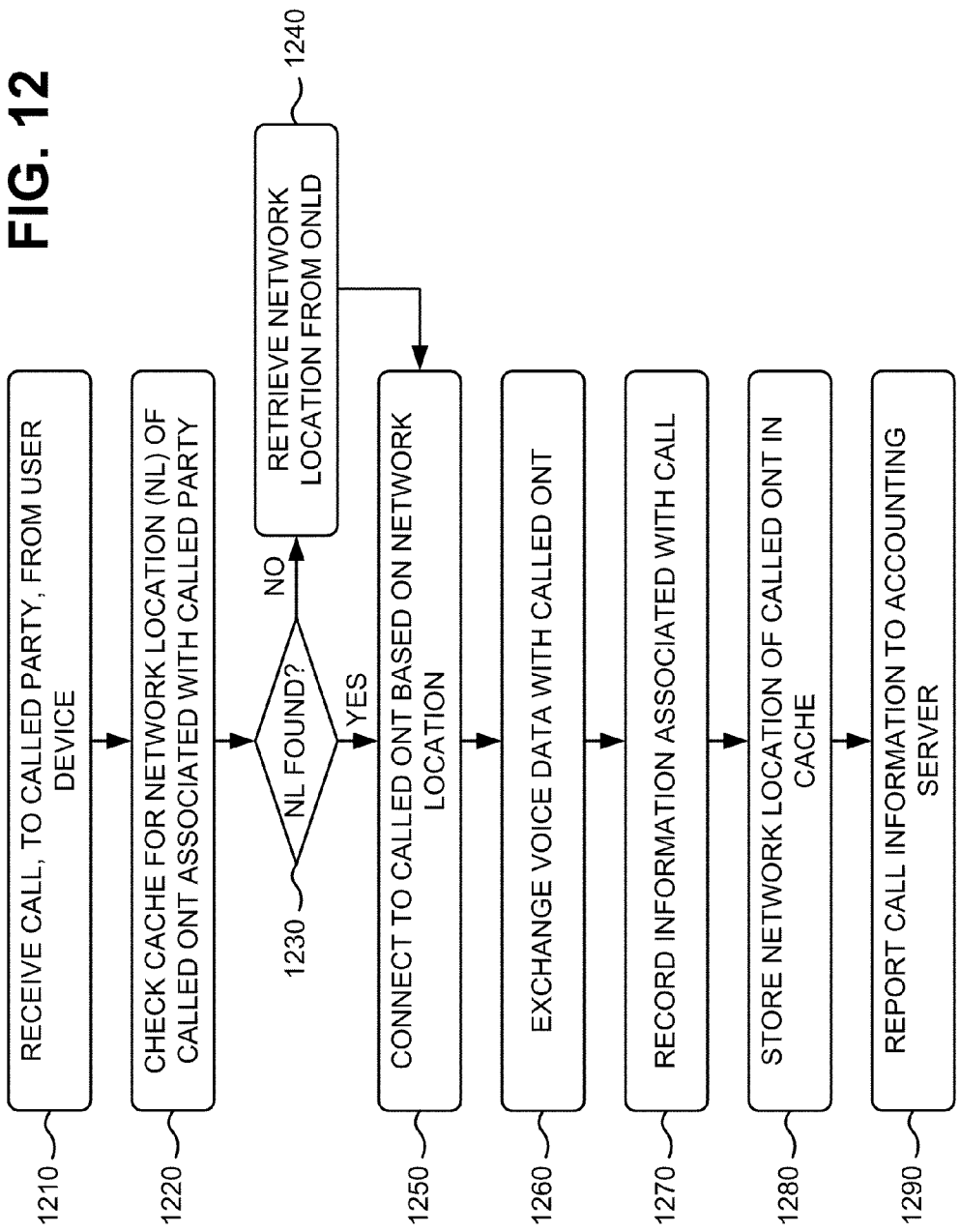

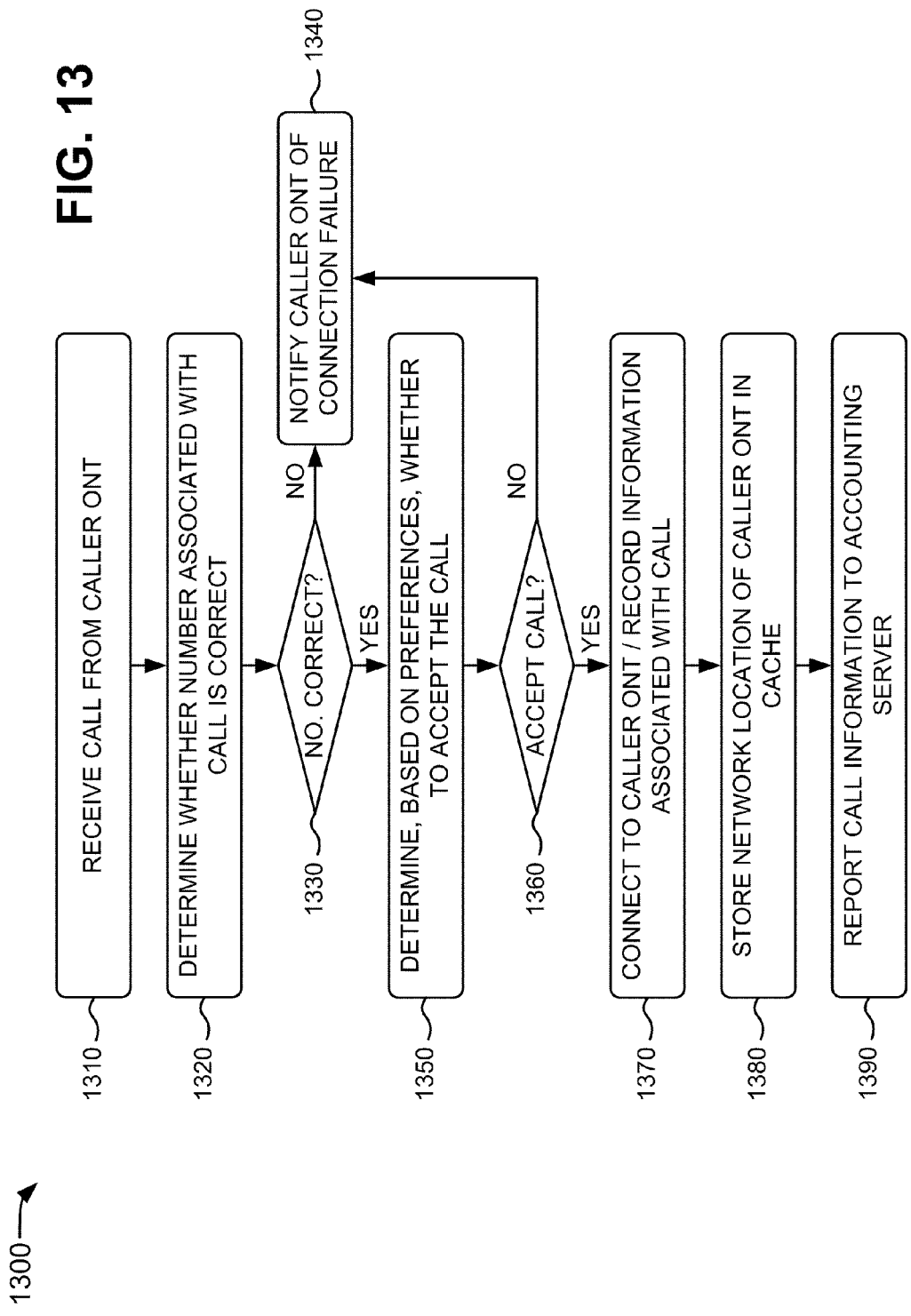

PEER-TO-PEER VOICE OVER INTERNET PROTOCOL

RELATED APPLICATION

This application claims priority under 35 U.S.C. §119 based on U.S. Provisional Patent Application No. 61/174,805, filed May 1, 2009, the disclosure of which is incorporated by reference herein in its entirety.

BACKGROUND

Today's premium telephone services provide much more than just voice. Features, such as voice mail, address books, contact specific ringtones, and customized diversion of incoming calls are common in a telephone service today. With the advent of voice over Internet protocol (VoIP), voice networks are becoming more and more integrated with data networks. Although VoIP started out as a by-product of cheap and high trunk bandwidth provided by Internet service providers (ISPs), it has now become a standard application offered by service providers. However, most service providers use centralized servers to provide VoIP voice services and host subscriber features.

Scaling such centralized VoIP systems (e.g., to meet increasing numbers of subscribers and/or service requests) is expensive, and there is an upper limit on the number of subscribers and/or service requests that a centralized VoIP system can accommodate. As the upper limit is approached (e.g., where the centralized VoIP servers are over eighty percent utilized), performance of the VoIP system degrades in a non-linear fashion. To address this, a second centralized VoIP system may be added to the original centralized VoIP system, even though the original VoIP system may have twenty percent of its resources available and the second VoIP system may be underutilized. Such an approach is expensive and wastes resources. In addition to the scalability issues, a core network infrastructure must also be upgraded to handle excessive traffic due to the increase in service requests. Furthermore, a centralized VoIP system often experiences delay and bandwidth constraints when satisfying service requirements. For example, long backhaul times and/or long queuing times associated with reaching the centralized servers may make service impossible to implement.

BRIEF DESCRIPTION OF THE DRAWINGS

FIG. 12 is a flow chart of an exemplary process for performing peer-to-peer VoIP, by a caller ONT, according to implementations described herein; and FIG. 13 is a flow chart of an exemplary process for performing peer-to-peer VoIP, by a called ONT, according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that may provide a peer-to-peer (P2P) VoIP service. The P2P VoIP service may provide all the features and services that a premium voice service provides today, but may also be scalable and resilient to failures. In the P2P VoIP service, the services formerly provided by centralized servers may be pushed to peers that may work in a distributive manner. In contrast to the centralized VoIP systems, the P2P VoIP service may reduce costs, may attain scalability, and may enhance resilience without comprising services provided to subscribers.

In an exemplary implementation, the systems and/or methods may provide optical network terminations or terminals (ONTs) that are termination points (e.g., at subscribers' premises) for fiber-to-the-premises (FTTP) networks (e.g., that support voice, data, and video over a single fiber). Each ONT may demultiplex data to various user devices, such as a personal computer, a telephone, a set-top box (STB), a router, etc. The systems and/or methods may provide voice services (e.g., formerly provided by centralized servers) via the ONTs, and may include a server infrastructure that provides routing, management, and emergency service functions for the ONTs. The server infrastructure may act as a P2P network. Such an arrangement may enable the systems and/or methods to scale both in endpoint (e.g., ONT) number and server infrastructure number.

In another exemplary implementation, a caller or calling ONT may receive a VoIP-based call (e.g., to a called party) from a user device, and may check a table (e.g., which may be locally cached) for a network location of a called ONT associated with the called party. If the network location is not found in the cache, the caller ONT may retrieve the network location from an ONT network location database (ONLD). When the network location is retrieved (e.g., either from the cache or the ONLD), the caller ONT may connect to the called ONT based on the network location, and may exchange voice data with the called ONT. The caller or called ONT may record information associated with the call (e.g., duration of the call, billing information, etc.), may store the network location of the called ONT in the cache, and may report the call information to an accounting server.

As used herein, the terms "user," "customer," and "subscriber," are intended to be broadly interpreted to include a user device or an ONT or a user of a user device and/or an ONT.

Figure 1:
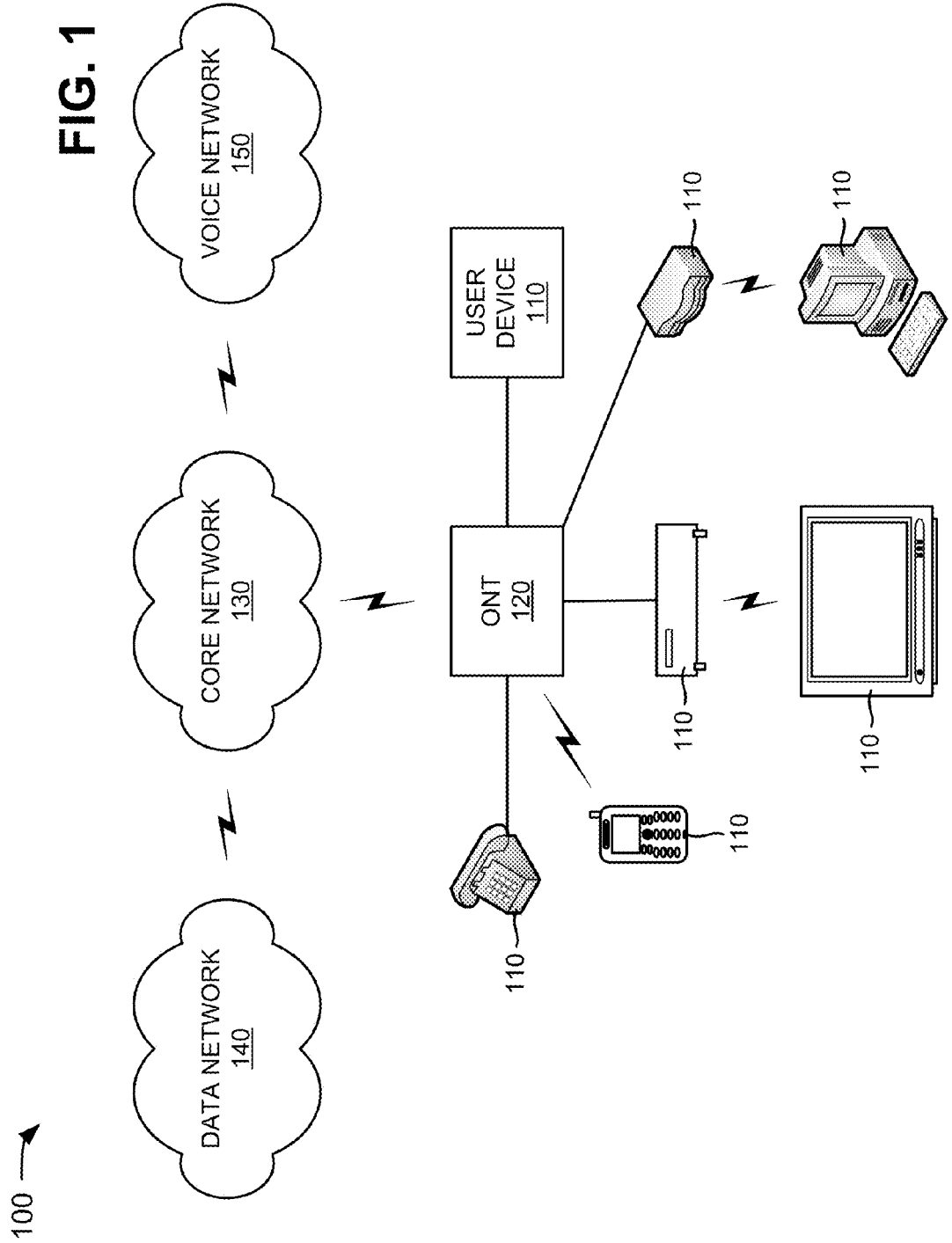
FIG. 1 is a diagram of an exemplary network in which systems and/or methods described herein may be implemented.

FIG. 1 depicts a diagram of an exemplary network 100 in which systems and/or methods described herein may be implemented. As illustrated, network 100 may include a group of user devices 110, an ONT 120, a core network 130, a data network 140, and a voice network 150. Components of network 100 may interconnect via wired and/or wireless connections. Seven user devices 110, a single ONT 120, a single core network 130, a single data network 140, and a single voice network 150 have been illustrated in FIG. 1 for simplicity. In practice, there may be more user devices 110, ONTs 120, core networks 130, data networks 140, and/or voice networks 150. Also, in some instances, one or more of the components of network 100 may perform one or more functions described as being performed by another one or more of the components of network 100.

Each of user devices 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a landline telephone, a television, a router, a STB, or other types of computation or communication devices. In an exemplary implementation, each of user devices 110 may include a device that is capable of accessing features and/or services (e.g., VoIP services, data services, etc.) provided by the other components of network 100. Although FIG. 1 depicts certain user devices 110 (e.g., a landline telephone, a wireless telephone, a STB, a television, a router, and a personal computer) interconnected with ONT 120, in other implementations, one or more different or additional user devices 110 may be interconnected with ONT 120.

ONT 120 may include one or more devices that terminate an optical network (e.g., core network 130), and provide an interface between the optical network and a subscriber's premises. In an exemplary implementation, ONT 120 may provide multiple service interfaces for the subscriber (e.g., it may provide an interface for telephony (i.e., voice) services; an interface for Ethernet (i.e., data) services; an interface for television (i.e., video) services; etc.). As shown in FIG. 1, ONT 120 may demultiplex data to various user devices 110, such as landline telephone 110, wireless telephone 110, STB 110, television 110 (e.g., via STB 110), router 110, personal computer 110 (e.g., via router 110), etc.

In an exemplary implementation, voice (VoIP) features (e.g., formerly provided by central voice servers) may be provided via ONT 120. With such an arrangement, heavily loaded central voice servers may no longer be required. This may enable a subscriber associated with ONT 120 to have an originating and terminating VoIP service sets provided geographically local to the subscriber's home or office user devices 110. For fixed home or office user devices 110, ONT 120 may reduce signaling and media backhaul, and may permit functionality and/or complexity of a service set to be tailored to an individual subscriber.

ONT 120 may know its own network location (e.g., in network 100), geographic location, and configuration, and may be able to locate other ONTs 120. The network location of ONT 120 may include information (e.g., an IP address of ONT 120) necessary to route a packet to ONT 120. The geographic location of ONT 120 may include information (e.g., an address of a physical location of ONT 120) that needs to be provided to an emergency service when an emergency call is made via ONT 120. ONT 120 may store information (e.g., traffic statistics, billing information, etc.) locally or using another network resource (e.g., within STB 110), may bill for its services, and may facilitate emergency calling and response. In an exemplary implementation, ONT 120 may be controlled by a service provider (e.g., associated with core network 130), and may be secure enough so that a subscriber or another entity may not manipulate ONT 120.

In one example, ONT 120 may include a variety of interfaces, such as an external IP interface, an account interface, a STB interface, etc. The external IP interface may connect ONT 120 to core network 130 and may enable ONT 120 to receive services associated with core network 130. The account interface may enable ONT 120 to provide account information to a customer (e.g., via user device 110). The customer may access, via the account interface, account preferences, address book(s), billing information, etc. associated with the customer.

The STB interface may connect ONT 120 to STB 110, and may enable ONT 120 to read and/or write information from/to STB 110. If a customer does not have STB 110, the STB interface may connect ONT 120 to a storage device associated with core network 130, and may enable ONT 120 to read and/or write information from/to the storage device. Further details of ONT 120 are provided below in connection with, for example, FIGS. 3-11.

Core network 130 may include a local area network (LAN), a wide area network (WAN), a metropolitan area network (MAN), an optical fiber (or fiber optic)-based network, or a combination of networks. In one exemplary implementation, core network 130 may include a fiber optic-based network (e.g., terminating at ONT 120) that manages voice services (e.g., VoIP) provided to/from ONT 120. Further details of core network 130 are provided below in connection with, for example, FIG. 2.

Data network 140 may include a LAN, a WAN, a MAN, an intranet, the Internet, or a combination of networks. In one exemplary implementation, data network 140 may include an IP-based network that provides data (e.g., multimedia, video, etc.) services to ONT 120 (e.g., via core network 130).

Voice network 150 may include a LAN, a WAN, a MAN, a telephone network, such as the Public Switched Telephone Network (PSTN), a cellular network, a Wi-Fi network, or a combination of networks. In one exemplary implementation, voice network 150 may include a network that provides voice (e.g., VoIP) services to ONT 120 (e.g., via core network 130).

In an exemplary implementation, network 100 may provide a variety of voice or telephony services (e.g., to user devices 110). For example, network 100 may provide account services, voice mail services, address book services, caller ID services, ringtone services, ringback tone services, click-to-dial services, three way calling services, call forwarding and scheduling services, emergency call services, lawful intercept services, accounting services, softphone services, etc.

With regard to account services, a subscriber may be provided an online service account that the subscriber may manage from any location connected to core network 130. The service account may include subscriber and/or customized service features that may be modified by the subscriber.

The voice mail services may enable a caller to leave a voice message when a subscriber does not respond to a call (e.g., via user device 110). The voice message may be accessible from landline telephone 110, wireless telephone 110, television 110, personal computer 110, and/or from another user device 110 connected to core network 130 (e.g., using the subscriber's service account).

With regard to the address book services, the subscriber may be provided with an address book that stores information about other subscribers, such as telephone numbers, pictures, addresses, etc. The address book may be edited by a subscriber using the subscriber's service account.

When a subscriber receives a call, the caller ID services may display a caller's telephone number on user device 110. Depending on a subscriber's preferences, the caller ID service may also display the caller's picture (and possibly other information) if user device 110 is capable of displaying such information.

The ringtone services may enable a subscriber to set specific ringtones for specific entries in the address book. A subscriber may edit ringtone preferences using the subscriber's service account.

A ringback tone is what a caller hears when a called telephone rings. The ringback tone services may enable a subscriber to select specific ringback tones for specific callers. The ringback tones may be provided by a service provider (e.g., associated with core network 130) and/or may include customized ringback tones provided by the subscriber.

With the click-to-dial services, a subscriber may log into a service account, may open an address book, and may select a contact in the address book in order to call the contact. When the contact is selected, the subscriber's user device 110 (e.g., wireless telephone 110) may ring, indicating that the call is ready to be set up. When the subscriber answers user device 110, the call may be established with the selected contact.

The three way calling services may enable a subscriber to call two distinct parties at the same time and to join the two calls to form a three way call where all three parties may hear each other.

With the call forwarding and scheduling services, a subscriber may choose when and what calls they want to receive on user device 110. The subscriber may choose calls to ignore or calls to forward to other telephone numbers, and may specify which calls are to be directed to which user devices 110. The subscriber may set these preferences using the subscriber's service account.

The emergency call services may enable a subscriber to make emergency calls from user devices 110. When the subscriber makes an emergency call, the service provider may provide the subscriber's location information to an emergency service.

Lawful intercept is the legally sanctioned official access to private communications, such as telephone calls or email messages. Lawful intercept is a security process in which a network operator or service provider gives law enforcement officials access to the communications of private individuals or organizations. The lawful intercept services may provide the service provider with built-in surveillance capabilities, which may permit law enforcement officials to monitor voice traffic in real time (e.g., enhancing the ability of law enforcement officials to conduct electronic surveillance).

The accounting services may enable a subscriber to obtain real time account billing information associated with any of user devices 110.

The softphone services may provide a subscriber with software that enables a personal computer, a laptop computer, etc. to function as a telephone device. The subscriber may install the software on any computer connected to core network 130 (e.g., via ONT 120), and may log in to the softphone services to make calls (e.g., as if making calls from a telephone device).

In other implementations, network 100 may provide services other than the services described herein. For example, network 100 may provide television services, video-on-demand (VOD) services, Internet services, etc.

Although FIG. 1 shows exemplary components (e.g., devices) of network 100, in other implementations, network 100 may contain fewer, different, differently arranged, or additional components than depicted in FIG. 1.

Figure 2:
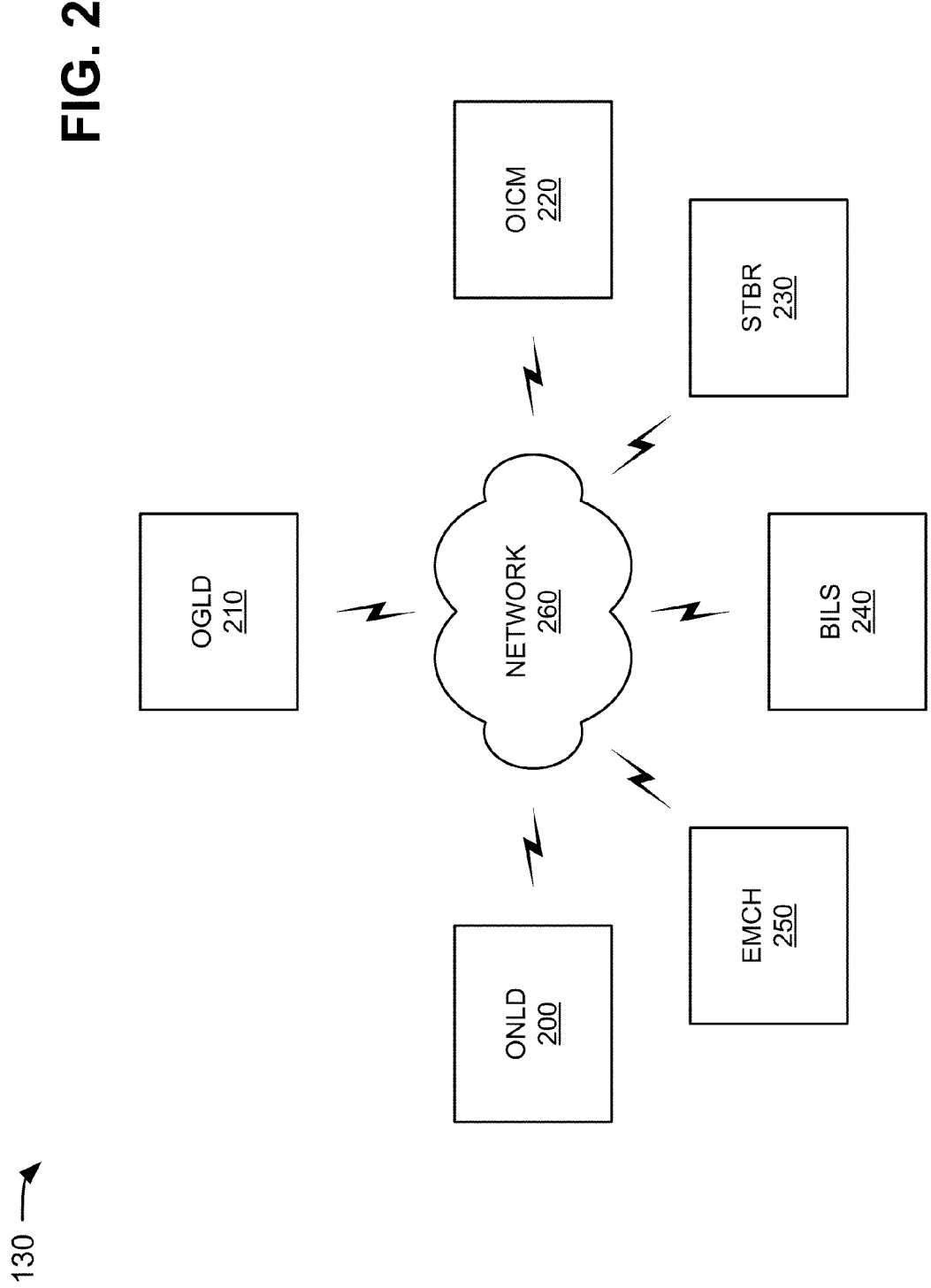
FIG. 2 is a diagram of exemplary components of a core network depicted in FIG. 1.

FIG. 2 is a diagram of exemplary components of core network 130. As illustrated, core network 130 may include an ONT network location database (ONLD) 200, an ONT geographic location database (OGLD) 210, an ONT initiation and configuration manager (OICM) 220, a set-top box replacer (STBR) 230, a billing server (BILS) 240, and an emergency call handler (EMCH) 250 interconnected by a network 260. Components of core network 130 may interconnect via wired and/or wireless connections. A single ONLD 200, OGLD 210, OICM 220, STBR 230, BILS 240, EMCH 250, and network 260 have been illustrated in FIG. 2 for simplicity. In practice, there may be more ONLDs 200, OGLDs 210, OICMs 220, STBRs 230, BILSs 240, EMCHs 250, and/or networks 260. Also, in some instances, one or more of the components of core network 130 may perform one or more functions described as being performed by another one or more of the components of core network 130.

In an exemplary implementation, one or more of the components of core network 130 may utilize one or more distributed hash tables (DHTs). The DHTs may use a keyspace that includes a set of integers (or other key notation) that maps to a set of buckets containing needed information. A keyspace partitioning may divide the keyspace among participating "nodes" (e.g., ONLD 200, OGLD 210, etc.), and the nodes may communicate with each other using an overlay network spanning the nodes. In this way, any node may locate an owner of any key. A key owner may be responsible for storing information associated with the key and for retrieving such information when requested by another node. Information (e.g., location information associated with ONT 120) may be associated with a key via a hash procedure. A lookup property (e.g., a telephone number) may be hashed to form a key, and the associated information (e.g., a geographic location, a network location, etc.) may be attached to the key. Such DHTs may provide efficient data storage and efficient data lookup. In one example, one or more components of core network 130 may implement and perform a lookup of DHTs. Alternatively, or additionally, one or more components of core network 130 and ONTs (e.g., ONT 120) may implement and perform a lookup of DHTs. In another example, one or more components of core network 130 may have read and write permission for the DHTs, and the ONTs may have only read permission for the DHTs. In still another example, the DHTs may be stored in only the one or more components of core network 130, or may be stored in the one or more components of core network 130 and in the ONTs.

ONLD 200 may include one or more server devices, or other types of computation or communication devices, that gather, process, search, and/or provide information in a manner described herein. In an exemplary implementation, ONLD 200 may store network location information (e.g., Internet protocol (IP) addresses) associated with ONTs (e.g., ONT 120). ONLD 200 may store the network location information using a DHT that includes telephone numbers as keys and network locations of ONTs as values. Each server device associated with ONLD 200 may store information about a set of ONTs (e.g., covering a particular area). The set of ONTs may be said to be associated with the particular server device of ONLD 200.

OGLD 210 may include one or more server devices, or other types of computation or communication devices, that gather, process, search, and/or provide information in a manner described herein. In an exemplary implementation, OGLD 210 may store geographic location information (e.g., county, city, state, etc.) associated with ONTs (e.g., ONT 120) using a DHT. In one example, OGLD 210 may be incorporated with ONLD 200 to form a single server device or a single set of server devices.

OICM 220 may include one or more server devices, or other types of computation or communication devices, that gather, process, search, and/or provide information in a manner described herein. In an exemplary implementation, OICM 220 may configure ONTs (e.g., ONT 120), and may input information into ONLD 200 and OGLD 210. In one example, OICM 220 may be the only component of core network 130 with permission to write information to the DHTs. In such an arrangement, ONLD 200 and OGLD 210 may read (or fetch) information from the DHTs (e.g., associated with ONLD 200 and OGLD 210), but may not write information to the DHTs.

STBR 230 may include one or more server devices, or other types of computation or communication devices, that gather, process, search, and/or provide information in a manner described herein. In an exemplary implementation, for subscribers who do not subscribe to television services and/or do not have STB 110, STBR 230 may be responsible for permanent storage of information associated with subscribers, ONTs (e.g., ONT 120), and/or other components of core network 130. Alternatively, or additionally, for subscribers who subscribe to television services, STB 110 may be responsible for permanent storage of information associated with subscribers and/or ONT 120.

BILS 240 may include one or more server devices, or other types of computation or communication devices, that gather, process, search, and/or provide information in a manner described herein. In an exemplary implementation, BILS 240 may maintain accounting (e.g., billing) information for subscribers associated with ONTs (e.g., ONT 120) and core network 130. The ONTs may be responsible for updating and sending accounting information to BILS 240.

EMCH 250 may include one or more server devices, or other types of computation or communication devices, that gather, process, search, and/or provide information in a manner described herein. In an exemplary implementation, EMCH 250 may manage emergency calls associated with ONT 120. EMCH 250 may retrieve geographic location information and other information (e.g., for ONT 120) from OGLD 210, and may provide the geographic location information of ONT 120 to an emergency service.

Network 260 may include a LAN, a WAN, a MAN, an optical fiber (or fiber optic)-based network, or a combination of networks. In one exemplary implementation, network 260 may enable ONLD 200, OGLD 210, OICM 220, STBR 230, BILS 240, and EMCH 250 to communicate with each other.

In an exemplary implementation, whenever a new ONT subscribing to core network 130 is installed, OICM 220 may add information (e.g., network location information, geographic location information, billing information, etc.) about the new ONT into ONLD 200, OGLD 210, and BILS 240. OICM 220 may also configure the new ONT so that the new ONT may become part of network 100 and calls may be made to/from the new ONT. In one example, OICM 220 may configure the new ONT by loading and executing application software on the new ONT; loading (e.g., in the new ONT) connectivity information associated with ONLD 200, OGLD 210, OICM 220, STBR 230 (e.g., if the new ONT is not associated with STB 110), BILS 240, and/or EMCH 250; loading default user preferences and settings, emergency call filters (e.g., used by the new ONT to distinguish emergency calls from regular calls), ringtones, ringback tones (e.g., a standard set of ringback tones provided to the subscriber by the service provider), etc. in the new ONT; etc. The new ONT may forward the default user preferences/settings, the ringtones, and/or the ringback tones to STB 110 and/or STBR 230 (e.g., for storage). The configuration process described above may occur when an ONT (e.g., ONT 120) is restarted (or becomes disabled and is enabled). In one example, when information provided by one or more devices of core network 130 changes, OICM 220 may update ONTs affected by the changed information. In another example, when a new device (e.g., a new server device) is added to core network 130, ONT 120 may connect to OICM 220 to receive connectivity information associated with the new server device.

Although FIG. 2 shows exemplary components of core network 130, in other implementations, core network 130 may contain fewer, different, differently arranged, or additional components than depicted in FIG. 2.

Figure 3:
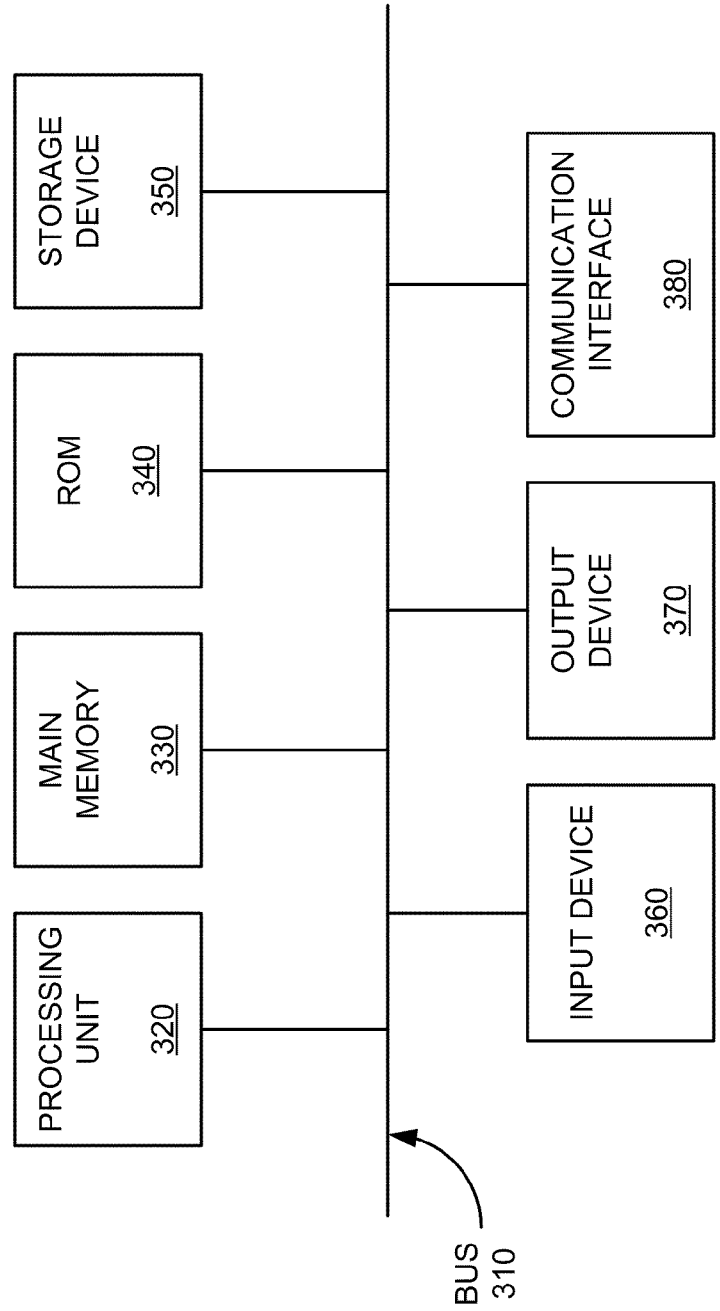
FIG. 3 is a diagram of exemplary components of a device that may correspond to one of the devices depicted in FIGS. 1 and 2.

FIG. 3 is a diagram of exemplary components of a device 300 that may correspond to one of the devices depicted in FIGS. 1 and 2. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. Alternatively, or additionally, one or more components of device 300 may perform one or more other tasks described as being performed by one or more other components of device 300. In an exemplary implementation, if device 300 corresponds to ONT 120, device 300 may not include permanent memory (e.g., ROM 340, storage device 350, etc.) but may include a cache (e.g., as shown below in connection with FIG. 5).

Figure 4:
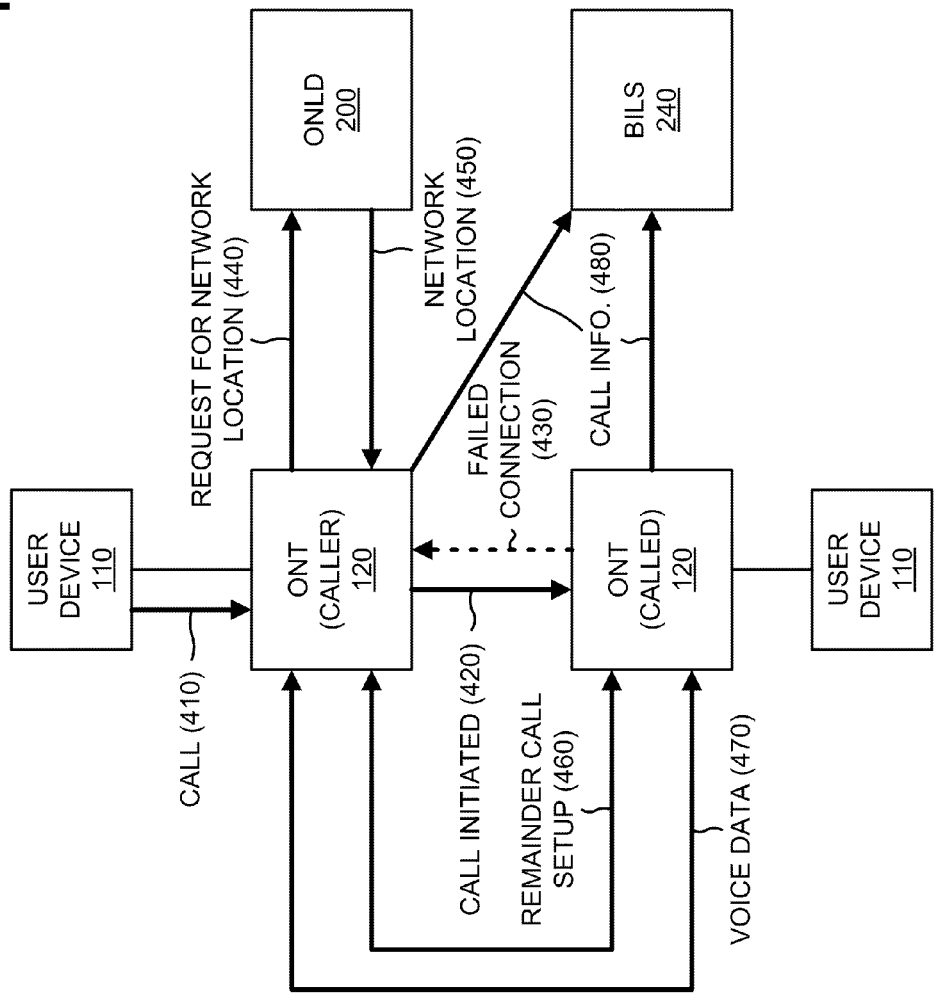
FIG. 4 is a diagram of exemplary interactions among components of an exemplary portion of the networks depicted in FIGS. 1 and 2.

FIG. 4 is a diagram of exemplary interactions among components of an exemplary portion 400 of network 100. As illustrated, exemplary network portion 400 may include user devices 110, ONTs 120 (e.g., a caller ONT 120 and a called ONT 120), ONLD 200, and BILS 240. User devices 110 and ONTs 120 may include the features described above in connection with, for example, FIGS. 1 and 3. ONLD 200 and BILS 240 may include the features described above in connection with, for example, FIGS. 2 and 3. In one exemplary implementation, network portion 400 may depict interactions during a call setup.

When user device 110 (e.g., associated with the caller ONT 120) makes a call 410 (e.g., to user device 110 associated with the called ONT 120), the caller ONT 120 may check if a telephone number associated with call 410 is an emergency telephone number (e.g., a "911" call) by using emergency call filters. If the telephone number associated with call 410 is not an emergency telephone number, the caller ONT 120 may check its cache for a network location of the called ONT 120. If the caller ONT 120 locates the network location of the called ONT 120 in its cache, the caller ONT 120 may attempt to establish a connection (e.g., a call initiation 420) with the called ONT 120. If connection 420 fails (e.g., as indicated by reference number 430) or if the caller ONT 120 is unable to locate the network location of the called ONT 120 in its cache, the caller ONT 120 may connect with ONLD 200 and may request the network location of the called ONT 120, as indicated by reference number 440. ONLD 200 may receive request 440 from the caller ONT 120, and may provide a network location 450 of the called ONT 120 based on request 440. Network location 450 of the called ONT 120 may not be revealed to a user of user device 110 in order to prevent security issues from arising.

When the caller ONT 120 receives network location 450 of the called ONT 120, the caller ONT 120 may attempt to establish connection 420 with the called ONT 120. Upon receiving the connection request, the called ONT 120 may determine whether the called ONT 120 is the correct recipient of the call (e.g., whether a called number is associated with the called ONT 120). If the called ONT 120 determines it is not the correct recipient of the call, the called ONT 120 may notify the caller ONT 120, resulting in failed connection 430. If the called ONT 120 determines it is the correct recipient of the call, the called ONT 120 may locate an entry in its address book (e.g., associated with the calling subscriber) and may check its preferences. If the preferences indicate that the call may be accepted, the called ONT 120 may accept the call initiation, may send a ringback tone to the caller ONT 120, and may forward identification and/or picture information (e.g., associated with the calling subscriber) to the called user device 110, as per the preferences.

If the called ONT 120 accepts the call, the called ONT 120 may establish a connection with the caller ONT 120 and may begin a remainder call setup 460. Call setup 460 may include the caller ONT 120 and the called ONT 120 exchanging control signals and starting the call. Once the call is setup, voice data 470 (e.g., provided by user devices 110) may be exchanged between the caller ONT 120 and the called ONT 120 via a direct connection between the caller ONT 120 and the called ONT 120. During the call, the caller ONT 120 and the called ONT 120 may record information 480 associated with the call, such as duration of the call, billing information associated with the call, etc. When the call is complete, the caller ONT 120 may add network location 450 to its cache, and the called ONT 120 may add a network location of the caller ONT 120 to its cache. Caching the network location information (e.g., in ONTs 120) may prevent future connection to ONLD 200 and DHT lookup for every call. When the call is complete, the caller ONT 120 and the called ONT 120 may also report call information 480 to BILS 240.

In contrast to the centralized VoIP service architecture, exemplary network portion 400 may reduce loads on server devices by using DHTs. Exemplary network portion 400 may eliminate bottleneck servers (e.g., which, in the centralized VoIP system, are responsible for forwarding all voice traffic) by enabling ONTs 120 to directly connect with each other. Exemplary network portion 400 may reduce traffic on a backbone network of the VoIP service architecture, and may reduce a hardware infrastructure associated with the backbone network.

Although FIG. 4 shows exemplary components of network portion 400, in other implementations, network portion 400 may contain fewer, different, differently arranged, or additional components than depicted in FIG. 4. Alternatively, or additionally, one or more components of network portion 400 may perform one or more other tasks described as being performed by one or more other components of network portion 400.

Figure 5:
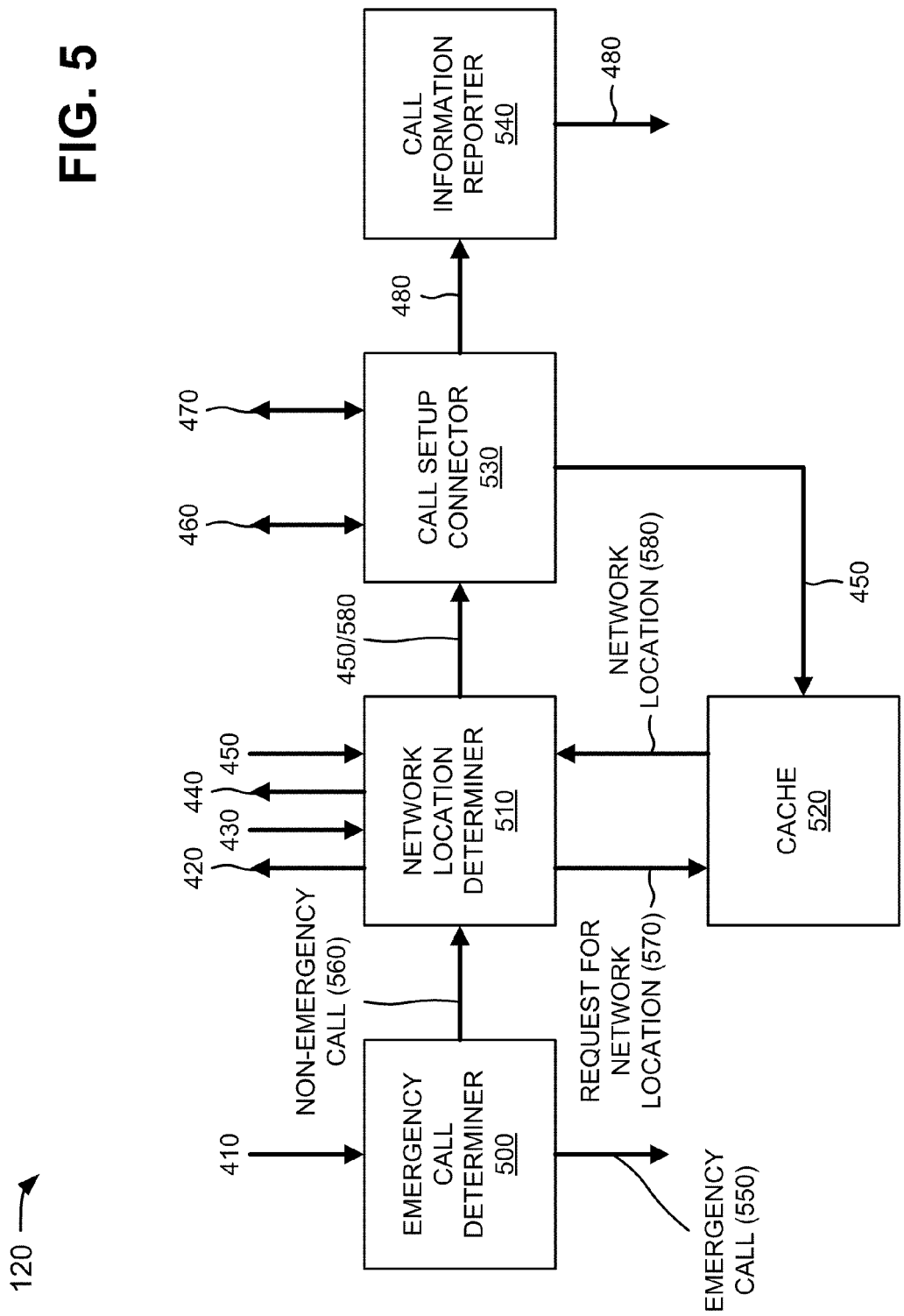
FIGS. 5 and 6 are diagrams of exemplary functional components of an optical network termination or terminal (ONT) depicted in FIG. 1.
Figure 6:
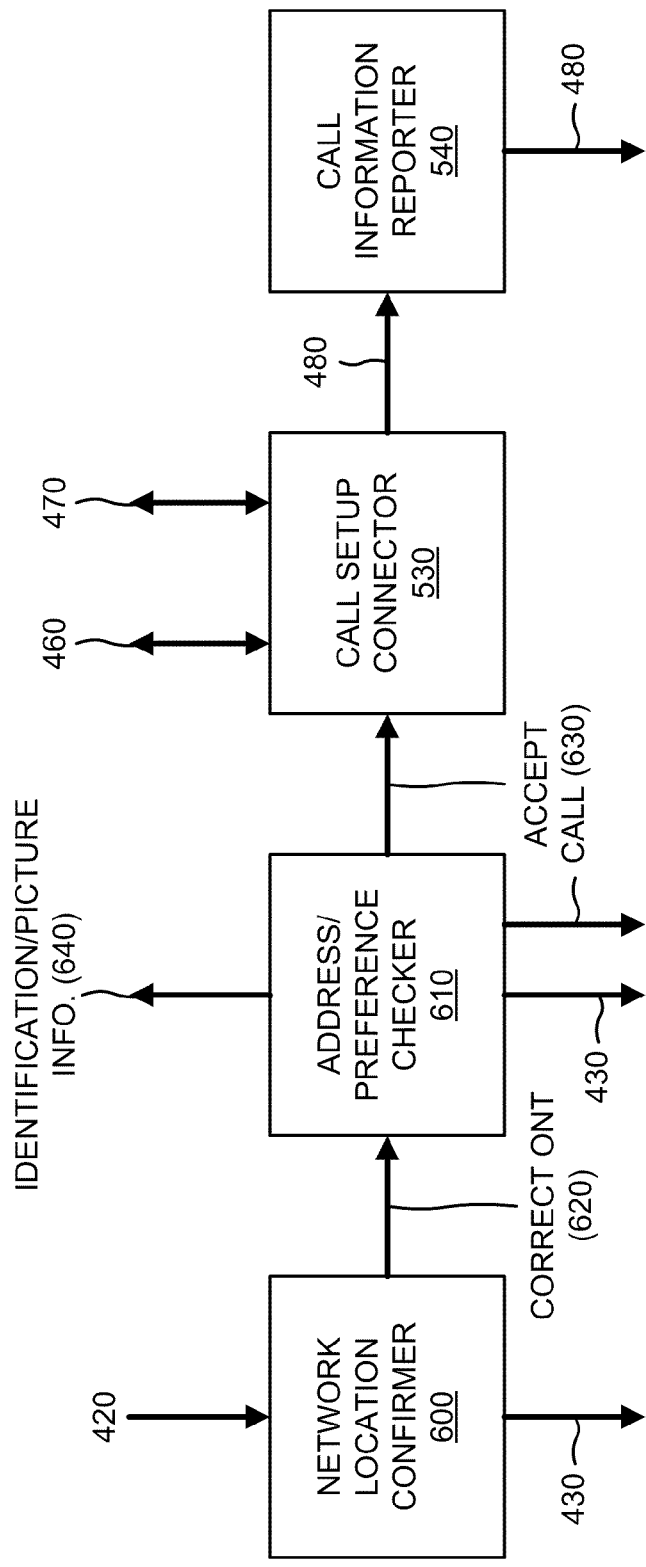

FIGS. 5 and 6 are diagrams of exemplary functional components of ONT 120. FIG. 5 may depict functional components of a caller ONT 120, and FIG. 6 may depict functional components of a called ONT 120. Other functional components of ONT 120 are described below in connection with FIGS. 7-10. In one implementation, the functions described in connection with FIGS. 5 and 6 may be performed by one or more components of device 300 (FIG. 3). As shown in FIG. 5, ONT 120 may include an emergency call determiner 500, a network location determiner 510, a cache 520, a call setup connector 530, and a call information reporter 540.

Emergency call determiner 500 may include hardware or a combination of hardware and software that may receive a call (e.g., call 410) from user device 110, and may determine whether call 410 is an emergency call 550 or a non-emergency call 560. In one example, emergency call determiner 500 may determine whether a telephone number associated with call 410 is an emergency telephone number (e.g., a "911" call) by using emergency call filters. If emergency call determiner 500 determines call 410 to be emergency call 550, emergency call determiner 500 may provide emergency call 550 to an emergency service. If emergency call determiner 500 determines call 410 to be non-emergency call 560, emergency call determiner 500 may provide non-emergency call 560 to network location determiner 510.

Network location determiner 510 may include hardware or a combination of hardware and software that may receive non-emergency call 560 from emergency call determiner 500, and may provide (e.g., to cache 520) a request 570 for a network location 580 of the called ONT 120. If network location 580 of the called ONT 120 is in cache 520, network location determiner 510 may establish connection 420 with the called ONT 120. If connection 420 fails (e.g., as indicated by reference number 430) or if network location 580 of the called ONT 120 is not in cache 520, network location determiner 510 may connect with ONLD 200 and may request the network location of the called ONT 120, as indicated by reference number 440. Network location determiner 510 may receive network location 450 from ONLD 200, and may provide network location 450 (or network location 580 if available in cache 520) to call setup connector 530.

Cache 520 may include one or more storage devices that may store network locations of ONTs 120 associated with core network 130. For example, with reference to FIG. 4, cache 520 may store a network location of the called ONT 120 (e.g., in one or more tables).

Call setup connector 530 may include hardware or a combination of hardware and software that may receive network location 450/580 from network location determiner 510, may establish connection 420 with the called ONT 120, and may continue call setup 460. Once the call is setup, voice data 470 (e.g., provided by user devices 110) may be exchanged between call setup connector 530 and the called ONT 120. During the call, call setup connector 530 may record information 480 associated with the call, such as duration of the call, billing information associated with the call, etc. When the call is complete, call setup connector 530 may provide call information 480 to call information reporter 540, and may add network location 450 to cache 520.

Call information reporter 540 may include hardware or a combination of hardware and software that may receive call information 480 from call setup connector 530, and may report call information 480 to BILS 240.

As shown in FIG. 6, ONT 120 may include a network location confirmer 600, an address/preference checker 610, call setup connector 530, and call information reporter 540. Call setup connector 530 and call information reporter 540 may include the features described above in connection with FIG. 5.

Network location confirmer 600 may include hardware or a combination of hardware and software that may receive a request to establish a connection (e.g., connection 420) for a call. Upon receiving the connection 420 request, network location confirmer 600 may determine whether the called ONT 120 is the correct recipient of the call (e.g., whether a called number is associated with the called ONT 120). If network location confirmer 600 determines that the called ONT 120 is not the correct recipient of the call, network location confirmer 600 may notify the called ONT 120 (e.g., via failed connection 430). If network location confirmer 600 determines that the called ONT 120 is the correct recipient of the call, network location confirmer 600 may provide an indication 620 (e.g., that the called ONT 120 is the correct recipient of the call) to address/preference checker 610.

Address/preference checker 610 may include hardware or a combination of hardware and software that may receive indication 620 from network location confirmer 600, may locate an entry in an address book (e.g., associated with the calling subscriber), and may check preferences. If the preferences indicate that the call may not be accepted, address/preference checker 610 may notify the called ONT 120 (e.g., via failed connection 430). If the preferences indicate that the call may be accepted, address/preference checker 610 may accept the call (e.g., as indicated by reference number 630), may send a ringback tone to the caller ONT 120, and may forward identification and/or picture information 640 (e.g., associated with the calling subscriber) to the called user device 110, as per the preferences. Address/preference checker 610 may provide call acceptance 630 to call setup connector 530.

Call setup connector 530 may receive call acceptance 630 from address/preference checker 610, may establish connection 420 with the caller ONT 120, and may continue call setup 460. Once the call is setup, voice data 470 (e.g., provided by user devices 110) may be exchanged between call setup connector 530 and the caller ONT 120. During the call, call setup connector 530 may record information 480 associated with the call, such as duration of the call, billing information associated with the call, etc. When the call is complete, call setup connector 530 may provide call information 480 to call information reporter 540. Call information reporter 540 may receive call information 480 from call setup connector 530, and may report call information 480 to BILS 240.

Although FIGS. 5 and 6 show exemplary functional components of ONT 120, in other implementations, ONT 120 may contain fewer, different, differently arranged, or additional functional components than depicted in FIGS. 5 and 6. Alternatively, or additionally, one or more functional components of ONT 120 may perform one or more other tasks described as being performed by one or more other functional components of ONT 120.

Figure 7:
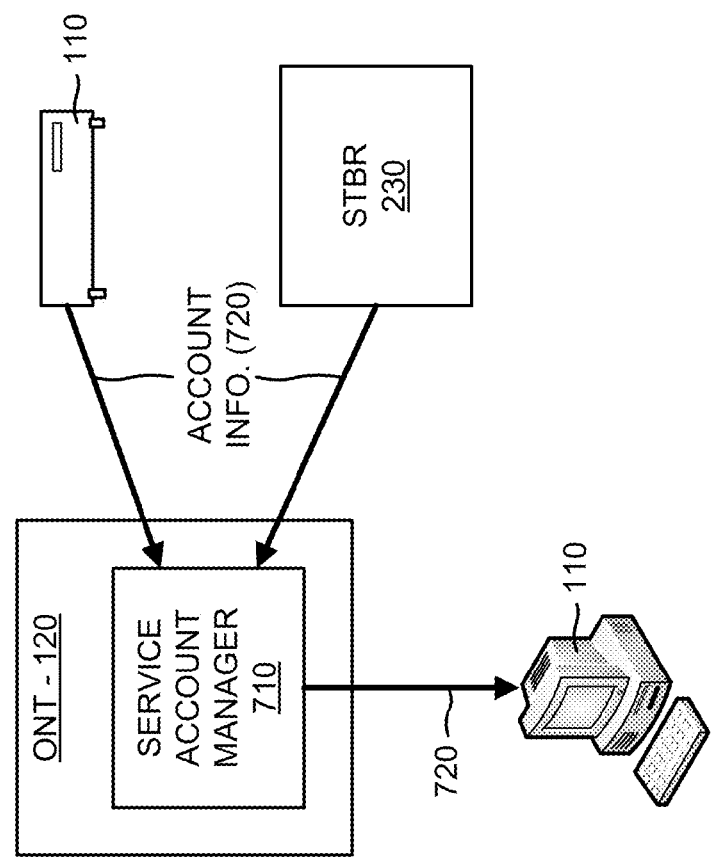
FIG. 7 is a diagram of exemplary service account interactions among components of an exemplary portion of the network depicted in FIG. 1.

FIG. 7 is a diagram of exemplary service account interactions among components of an exemplary portion 700 of network 100. As illustrated, exemplary network portion 700 may include personal computer 110, STB 110, ONT 120, and STBR 230. Personal computer 110, STB 110, and ONT 120 may include the features described above in connection with, for example, FIGS. 1 and 3-6. STBR 230 may include the features described above in connection with, for example, FIGS. 2 and 3.

As further shown in FIG. 7, ONT 120 may include a service account manager 710 (e.g., implemented by one or more components of device 300 (FIG. 3)). Service account manager 710 may retrieve account information 720 stored in STB 110 or STBR 230 (e.g., for subscribers who do not have STB 110). Account information 720 may include initial service account parameters, default user preferences, etc. A subscriber may access account information 720 from personal computer 110 by logging in to the subscriber's service account (e.g., via service account manager 710). The subscriber (e.g., via personal computer 110) may alter account information 720, and service account manager 710 may store the altered account information 720 in STB 110 or STBR 230. In an exemplary implementation, ONT 120 may provide features (e.g., call notification via email or text messaging) to a wireless user device, since all subscriber information (e.g., address books, preferences, account information 720, etc.) may be stored in STB 110 or STBR 230.

Although FIG. 7 shows exemplary components of network portion 700, in other implementations, network portion 700 may contain fewer, different, differently arranged, or additional components than depicted in FIG. 7. Alternatively, or additionally, one or more components of network portion 700 may perform one or more other tasks described as being performed by one or more other components of network portion 700.

Figure 8:
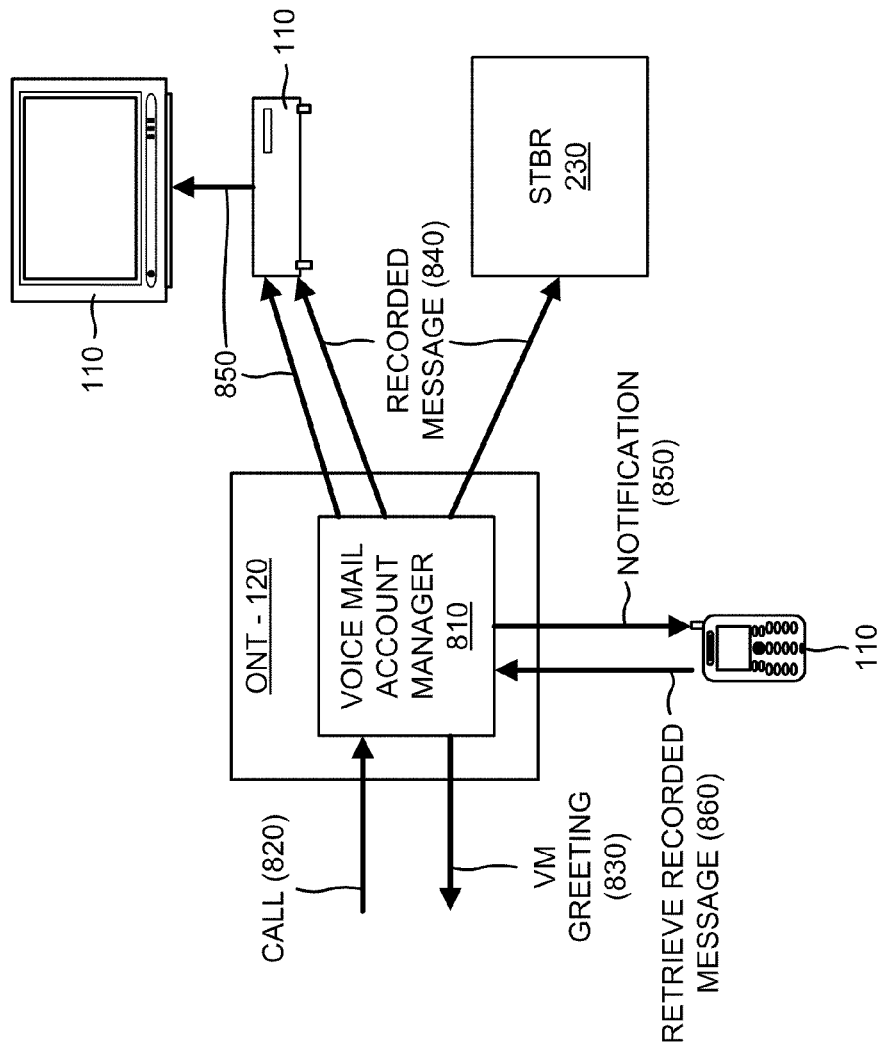
FIG. 8 is a diagram of exemplary voice mail interactions among components of an exemplary portion of the network depicted in FIG. 1.

FIG. 8 is a diagram of exemplary voice mail interactions among components of an exemplary portion 800 of network 100. As illustrated, exemplary network portion 800 may include wireless telephone 110, television 110, STB 110, ONT 120, and STBR 230. Wireless telephone 110, television 110, STB 110, and ONT 120 may include the features described above in connection with, for example, FIGS. 1 and 3-7. STBR 230 may include the features described above in connection with, for example, FIGS. 2, 3, and 7.

As further shown in FIG. 8, ONT 120 may include a voice mail (VM) account manager 810 (e.g., implemented by one or more components of device 300 (FIG. 3)). Voice mail account manager 810 may receive a call 820 from a caller ONT 120.

If the called subscriber is busy or if the called subscriber's preferences specify, voice mail account manager 810 may forward call 820 to the called subscriber's voice mail, and may provide a voice mail greeting 830 to the caller ONT 120. Voice mail account manager 810 may record a voice message 840 from the caller, and may provide recorded message 840 to STB 110 or to STBR 230 (e.g., if the subscriber does not have STB 110). In an exemplary implementation, voice mail account manager 810 may not be under the subscriber's control and recorded message 840 may not be accidently deleted. In an exemplary implementation, voice mail account manager 810 may provide a subscriber an option of backing up recorded messages to other ONTs 120 and/or STBs 110.

When recorded message 840 is received and stored by voice mail account manager 810, voice mail account manager 810 may (e.g., depending on subscriber preferences) send a notification 850 (e.g., providing notification of recorded message 840) to user devices 110 associated with ONT 120. For example, voice mail account manager 810 may provide notification 850 to wireless telephone 110, to television 110 (e.g., via STB 110), or to an online account portal. Upon receipt of notification 850, the subscriber may access recorded message 840 via one or more user devices 110. For example, wireless telephone 110 may access voice mail account manager 810, and may retrieve recorded message 840 from voice mail account manager 810, as indicated by reference number 860.

Although FIG. 8 shows exemplary components of network portion 800, in other implementations, network portion 800 may contain fewer, different, differently arranged, or additional components than depicted in FIG. 8. Alternatively, or additionally, one or more components of network portion 800 may perform one or more other tasks described as being performed by one or more other components of network portion 800.

Figure 9:
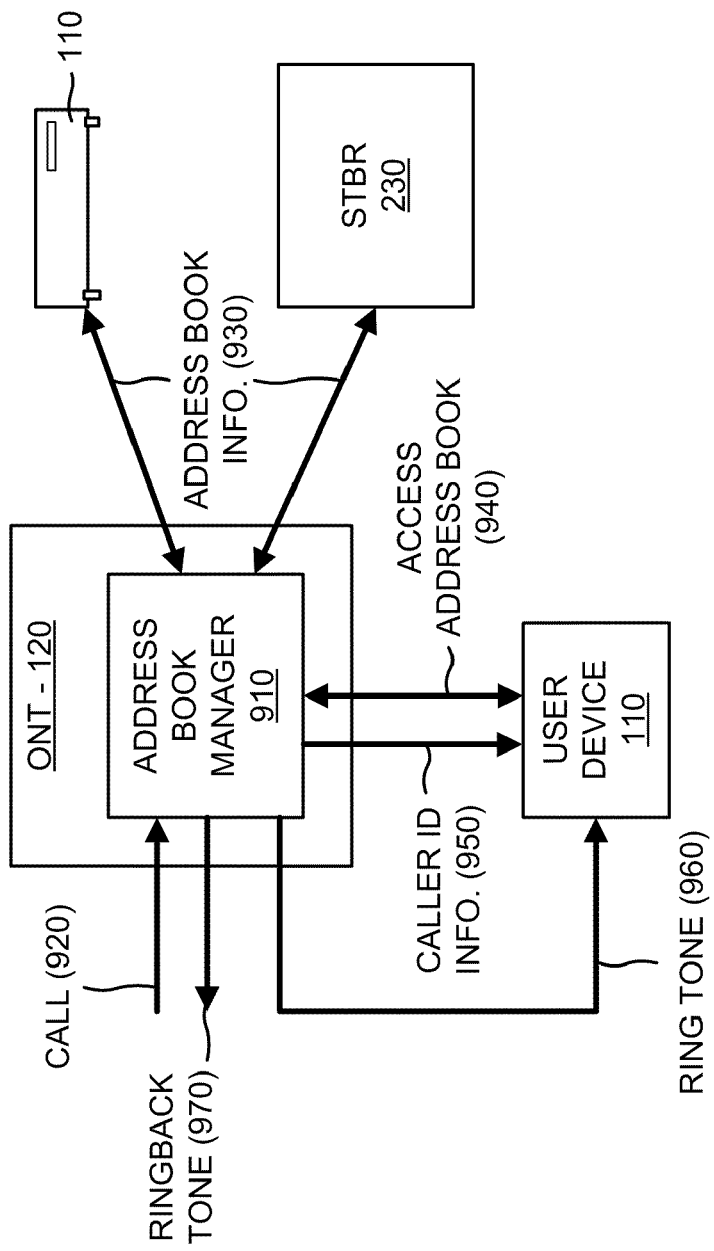
FIG. 9 is a diagram of exemplary address book, caller identification (ID), ringtone, and ringback tone interactions among components of an exemplary portion of the network depicted in FIG. 1.

FIG. 9 is a diagram of exemplary address book, caller ID, ringtone, and ringback tone interactions among components of an exemplary portion 900 of network 100. As illustrated, exemplary network portion 900 may include user device 110, STB 110, ONT 120, and STBR 230. User device 110, STB 110, and ONT 120 may include the features described above in connection with, for example, FIGS. 1 and 3-8. STBR 230 may include the features described above in connection with, for example, FIGS. 2, 3, 7, and 8.

As further shown in FIG. 9, ONT 120 may include an address book manager 910 (e.g., implemented by one or more components of device 300 (FIG. 3)). Address book manager 910 may store an address book of a subscriber (e.g., associated with ONT 120) in cache 520 (FIG. 5) of ONT 120. The subscriber's address book may also be stored in STB 110 or SBR 230 (e.g., if the subscriber does not have STB 110). When ONT 120 receives a call 920, address book manager 910 may retrieve address book information 930 (e.g., from the address book provided in STB 110, STBR 230, and/or cache 520) of a caller associated with call 920. Address book information 930 may include a picture of the caller, caller ID information, etc. In one example, the subscriber may access the address book, as indicated by reference number 940, from user device 110 (e.g., a wireless telephone) connected to ONT 120 (e.g., in order to make a call to a contact provided in the address book). In another example, the subscriber may access and edit the address book from a personal computer connected to ONT 120 (e.g., via the subscriber's service account).

In an exemplary implementation, when address book manager 910 receives call 920, address book manager 910 may search for the caller's entry in the subscriber's address book. If address book manager 910 locates the caller's entry, address book manager 910 may, depending on the subscriber's preferences, transfer caller ID information 950 (e.g., a name and a picture of the caller) to user device 110 (or to STB 110 for viewing on television 110 (not shown)).

In another exemplary implementation, when address book manager 910 receives call 920, address book manager 910 may select a ring tone 960 for call 920. In one example, ring tone 960 may be associated with the caller (e.g., as provided in the subscriber's address book). In another example, ring tone 960 may be selected (e.g., by address book manager 910) based on the subscriber's preferences. Address book manager 910 may retrieve ring tone 960 from STB 110 or STBR 230, and may provide the ring tone to user device 110. Alternatively, or additionally, a set of standard ring tones may be provided in user device 110, and, when call 920 is received, address book manager 910 may indicate (e.g., to user device 110) which of the standard ring tones to play.

In still another exemplary implementation, when address book manager 910 receives call 920, address book manager 910 may select (e.g., from the address book) a ringback tone 970 corresponding to the caller. Ringback tone 970 may include a ringback tone provided in a set of universal tones or may include a custom tone (e.g., stored in STB 110 or STBR 230). If ringback tone 970 is a particular one of the universal tones, address book manager 910 may send a signal (e.g., to a caller ONT 120) for the particular universal tone. The caller ONT 120 may retrieve the particular universal tone (e.g., from its associated STB 110 or STBR 230) and may play the particular universal tone to the caller. If ringback tone 970 is a custom tone, address book manager 910 may retrieve the custom tone from STB 110 or STBR 230 and may stream the custom tone to the caller ONT 120 (e.g., which then plays the custom tone to the caller).

Although FIG. 9 shows exemplary components of network portion 900, in other implementations, network portion 900 may contain fewer, different, differently arranged, or additional components than depicted in FIG. 9. Alternatively, or additionally, one or more components of network portion 900 may perform one or more other tasks described as being performed by one or more other components of network portion 900.

Figure 10:
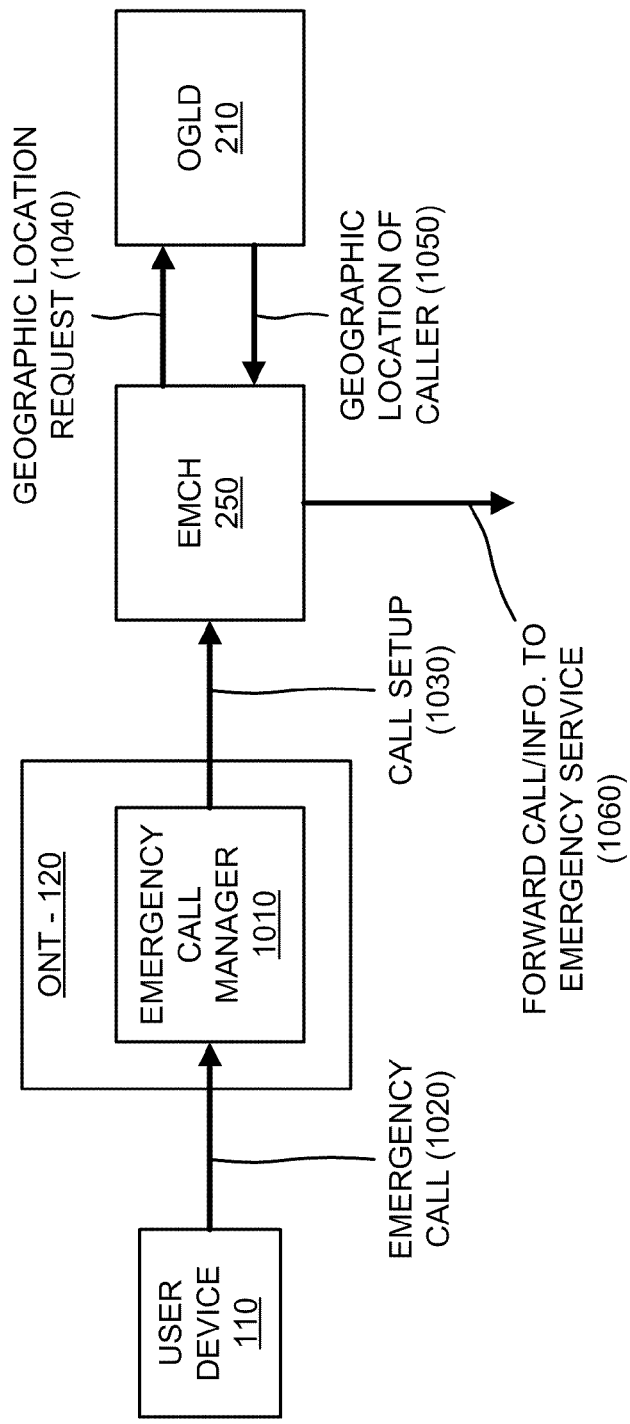
FIG. 10 is a diagram of exemplary emergency call interactions among components of an exemplary portion of the network depicted in FIG. 1.

FIG. 10 is a diagram of exemplary emergency call interactions among components of an exemplary portion 1000 of network 100. As illustrated, exemplary network portion 1000 may include user device 110, ONT 120, OGLD 210, and EMCH 250. User device 110 and ONT 120 may include the features described above in connection with, for example, FIGS. 1 and 3-9. OGLD 210 and EMCH 250 may include the features described above in connection with, for example, FIGS. 2 and 3.

As further shown in FIG. 10, ONT 120 may include an emergency call manager 1010 (e.g., implemented by one or more components of device 300 (FIG. 3)). When a caller (e.g., via user device 110) provides an emergency call 1020 to ONT 120, emergency call manager 1010 may identify a number associated with emergency call 1020 (e.g., using emergency call filters) as an emergency number (e.g., a "911" number). When emergency call manager 1010 identifies emergency call 1020 (e.g., as a request for emergency services), emergency call manager 1010 may not perform a normal call setup procedure (e.g., as described above in connection with FIG. 4) for emergency call 1020. Rather, emergency call manager 1010 may connect to an EMCH (e.g., EMCH 250) associated with ONT 120, and may exchange call setup information 1030 with EMCH 250. EMCH 250 may connect to OGLD 210, and may provide a geographic location request 1040 (e.g., requesting a geographic location of the caller) to OGLD 210. OGLD 210 may retrieve a geographic location 1050 of the caller (e.g., from a DHT), and may provide geographic location 1050 to EMCH 250. EMCH 250 may forward emergency call 1020 and necessary emergency information (e.g., geographic location 1050 of the caller) to an appropriate emergency service (e.g., a police station, a fire company, an ambulatory service, etc.), as indicated by reference number 1060.

Although FIG. 10 shows exemplary components of network portion 1000, in other implementations, network portion 1000 may contain fewer, different, differently arranged, or additional components than depicted in FIG. 10. Alternatively, or additionally, one or more components of network portion 1000 may perform one or more other tasks described as being performed by one or more other components of network portion 1000.

Figure 11:
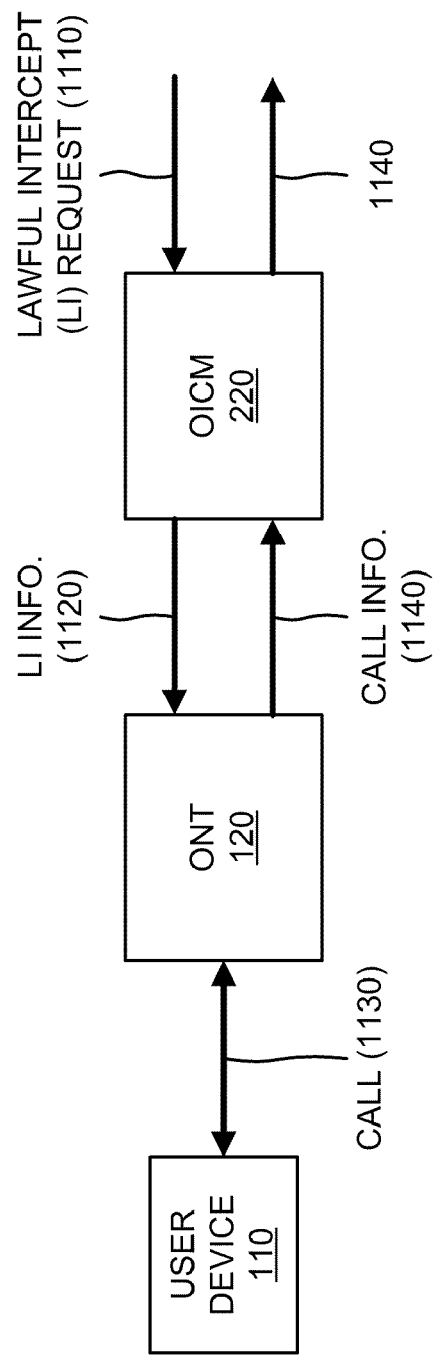
FIG. 11 is a diagram of exemplary lawful intercept interactions among components of an exemplary portion of the network depicted in FIG. 1.

FIG. 11 is a diagram of exemplary lawful intercept interactions among components of an exemplary portion 1100 of network 100. As illustrated, exemplary network portion 1100 may include user device 110, ONT 120, and OICM 220. User device 110 and ONT 120 may include the features described above in connection with, for example, FIGS. 1 and 3-10. OICM 220 may include the features described above in connection with, for example, FIGS. 2 and 3.

OICM 220 may have access to all ONTs 120 associated with core network 130. When a law enforcement agency wishes to intercept calls to and/or from an ONT 120, the law enforcement agency may provide a lawful intercept (LI) request 1110 to OICM 220. OICM 220 may receive LI request 1110, and may provide LI information 1120 (e.g., informing ONT 120 of LI request 1110) to ONT 120. ONT 120 may receive LI information 1120 and, when ONT 120 receives or provides a call 1130 (e.g., from or to user device 110), ONT 120 may capture information 1140 associated with call 1130. ONT 120 may forward call information 1140 to OICM 220 and to a called/calling party associated with call 1130 (e.g., similar to a three way call). Interception of call information 1140 may remain transparent to a subscriber associated with user device 110 and with ONT 120. OICM 220 may format call information 1140 and may provide the formatted call information 1140 to the law enforcement agency that issued LI request 1110.

Although FIG. 11 shows exemplary components of network portion 1100, in other implementations, network portion 1100 may contain fewer, different, differently arranged, or additional components than depicted in FIG. 11. Alternatively, or additionally, one or more components of network portion 1100 may perform one or more other tasks described as being performed by one or more other components of network portion 1100.

Although not shown in FIGS. 4-11, in exemplary implementations, ONT 120 may provide a variety of other voice or telephony services. For example, ONT 120 may provide click-to-dial services, three way calling services, call forwarding and scheduling services, accounting services, and/or softphone services.

With regard to click-to-dial services, when a subscriber logs into the subscriber's account (e.g., via user device 110) and selects a telephone number to call (e.g., from the subscriber's address book), ONT 120 may call one or more of the subscriber's user devices 110 (e.g., landline telephone 110, wireless telephone 110, etc.). When the subscriber answers the call from ONT 120, ONT 120 may automatically initiate a call setup procedure (e.g., as described above in connection with FIG. 4) with the selected telephone number.

For three way calling, a caller ONT 120 may simultaneously connect to two other called ONTs 120. The caller ONT 120 may make the two connections by performing a normal call procedure (e.g., as described above in connection with FIG. 4) twice. Once the two connections are established, the caller ONT 120 may inform the two called ONTs 120 about the three way call and may forward the two called ONTs 120 information identifying the two called ONTs 120 to each other. The caller ONT 120 may forward voice traffic from one called ONT 120 to the other called ONT 120. The received voice traffic may appear just like a normal call to the called ONTs 120.

Call forwarding and scheduling preferences of a subscriber may be included in the subscriber's profile data, may be provided in cache 520 (FIG. 5) of ONT 120, and may be stored in STB 110 (or STBR 230 if the subscriber does not have STB 110) by ONT 120. When ONT 120 receives a call, ONT 120 may check the call forwarding and scheduling preferences. If the call is supposed to be forwarded (e.g., pursuant to the call forwarding and scheduling preferences), ONT 120 may forward the call to a desired destination (e.g., one of user devices 110).

With regard to accounting services, a caller ONT 120 and a called ONT 120 may record a duration of every call. When the call is completed, the caller ONT 120 and the called ONT 120 may report information about the call (e.g. call duration) to BILS 240. BILS 240 may provide accounting information (e.g., billing) to the caller ONT 120 and the called ONT 120, and the caller ONT 120 and the called ONT 120 may transfer the accounting information to their respective STBs 110 (e.g., or to STBR 230). A subscriber may view the accounting information via the subscriber's service account. In an exemplary implementation, whenever the subscriber logs into the service account to check the accounting information (e.g., minutes used, free minutes left, etc.), the billing information may be provided by ONT 120 (e.g., after ONT 120 retrieves the billing information from STB 110). However, BILS 240 may maintain all billing information and may periodically update the billing information at ONT 120. Unlike other services, the billing information may not be stored only on ONT 120 because the billing information may be important to a service provider, and the service provider may need to access and/or modify the billing information.

When a subscriber begins a softphone application (e.g., from personal computer 110), personal computer 110, after being authenticated, may automatically connect to ONT 120. A direct connection between the softphone (e.g., personal computer 110) and ONT 120 may be established as long as the subscriber remains logged in. ONT 120 may provide softphone features to personal computer 110. For example, signaling may be backhauled to ONT 120, and a voice path may be established between personal computer 110 and a called user device 110.

FIG. 12 is a flow chart of an exemplary process 1200 for performing peer-to-peer VoIP according to implementations described herein. In one implementation, process 1200 may be performed by ONT 120 (e.g., a caller ONT 120). In another implementation, some or all of process 1200 may be performed by another device or group of devices, including or excluding the caller ONT 120.

As shown in FIG. 12, process 1200 may include receiving a call, to a called party, from a user device (block 1210), and checking a cache for a network location of a called ONT associated with the called party (block 1220). If the network location is not found in the cache (block 1230-NO), the network location may be retrieved from an ONLD (block 1240). For example, in implementations described above in connection with FIG. 4, when user device 110 (e.g., associated with the caller ONT 120) makes call 410 (e.g., to user device 110 associated with the called ONT 120), the caller ONT 120 may check its cache for a network location of the called ONT 120. If the caller ONT 120 locates the network location of the called ONT 120 in its cache, the caller ONT 120 may attempt to establish connection 420 with the called ONT 120. If connection 420 fails (e.g., as indicated by reference number 430) or if the caller ONT 120 is unable to locate the network location of the called ONT 120 in its cache, the caller ONT 120 may connect with ONLD 200 and may request the network location of the called ONT 120, as indicated by reference number 440. ONLD 200 may receive request 440 from the caller ONT 120, and may provide network location 450 of the called ONT 120 based on request 440. Network location 450 of the called ONT 120 may not be revealed to a user of user device 110 in order to prevent security issues from arising.

As further shown in FIG. 12, if the network location is found in the cache (block 1230 -YES) or if the network location is retrieved from the ONLD (block 1240), process 1200 may include connecting to the called ONT based on the network location (block 1250) and exchanging voice data with the called ONT (block 1260). For example, in implementations described above in connection with FIG. 4, if the called ONT 120 accepts the call, the caller ONT 120 may establish a connection with the called ONT 120 and may continue call setup 460. Call setup 460 may include the caller ONT 120 and the called ONT 120 exchanging control signals and completing call setup 460. Once the call is set up, voice data 470 (e.g., provided by user devices 110) may be exchanged between the caller ONT 120 and the called ONT 120 via a direct connection between the caller ONT 120 and the called ONT 120.

Returning to FIG. 12, information associated with the call may be recorded (block 1270), the network location of the called ONT may be stored in the cache (block 1280), and the call information may be reported to an accounting server (block 1290). For example, in implementations described above in connection with FIG. 4, during the call, the caller ONT 120 may record information 480 associated with the call, such as duration of the call, billing information associated with the call, etc. When the call is complete, the caller ONT 120 may add network location 450 to its cache. Caching the network location information (e.g., in ONTs 120) may prevent future connection to ONLD 200 and DHT lookup for every call. When the call is complete, the caller ONT 120 may also report call information 480 to BILS 240.

FIG. 13 is a flow chart of an exemplary process 1300 for performing peer-to-peer VoIP according to implementations described herein. In one implementation, process 1300 may be performed by ONT 120 (e.g., a called ONT 120). In another implementation, some or all of process 1300 may be performed by another device or group of devices, including or excluding the called ONT 120.

As shown in FIG. 13, process 1300 may include receiving a call from a caller ONT (block 1310), and determining whether a number associated with the call is correct (block 1320). If the number is not correct (block 1330-NO), the caller ONT may be notified of a connection failure (block 1340). For example, in implementations described above in connection with FIG. 6, network location confirmer 600 of the called ONT 120 may receive a request to establish a connection (e.g., connection 420) for a call. Upon receiving the connection request, network location confirmer 600 may determine whether the called ONT 120 is the correct recipient of the call (e.g., whether a called number is associated with the called ONT 120). If network location confirmer 600 determines that the called ONT 120 is not the correct recipient of the call, network location confirmer 600 may notify the called ONT 120 (e.g., via failed connection 430).

As further shown in FIG. 13, if the number is correct (block 1330-YES), process 1300 may include determining, based on preferences, whether to accept the call (block 1350). If the call is not accepted (block 1360-NO), the caller ONT may be notified of a connection failure (block 1340). For example, in implementations described above in connection with FIG. 6, if network location confirmer 600 of the called ONT 120 determines that the called ONT 120 is the correct recipient of the call, network location confirmer 600 may provide indication 620 (e.g., that the called ONT 120 is the correct recipient of the call) to address/preference checker 610 of the called ONT 120. Address/preference checker 610 may receive indication 620 from network location confirmer 600, may locate an entry in an address book (e.g., associated with the calling subscriber), and may check preferences. If the preferences indicate that the call may not be accepted, address/preference checker 610 may notify the called ONT 120 (e.g., via failed connection 430).

Returning to FIG. 13, if the call is accepted block 1360-YES), process 1300 may include connecting to the caller ONT and recording information associated with the call (block 1370), storing the network location of the caller ONT in a cache (block 1380), and reporting the call information to an accounting server (block 1390). For example, in implementations described above in connection with FIG. 6, if the preferences indicate that the call may be accepted, address/preference checker 610 of the called ONT 120 may accept the call (e.g., as indicated by reference number 630), may send a ringback tone to the caller ONT 120, and may forward identification and/or picture information 640 (e.g., associated with the calling subscriber) to the called user device 110, as per the preferences. Call setup connector 530 of the called ONT 120 may establish connection 420 with the caller ONT 120, and may continue call setup 460. Once the call is setup, voice data 470 (e.g., provided by user devices 110) may be exchanged between call setup connector 530 and the caller ONT 120. During the call, call setup connector 530 may record information 480 associated with the call. When the call is complete, call setup connector 530 may provide call information 480 to call information reporter 540 of the caller ONT 120. Call information reporter 540 may receive call information 480 from call setup connector 530, and may report call information 480 to BILS 240.

Implementations described herein may include systems and/or methods that may provide a peer-to-peer (P2P) VoIP service. The P2P VoIP service may provide all the features and services that a premium voice service provides today, but may also be scalable and resilient to failures. In the P2P VoIP service, the services formerly provided by centralized servers may be pushed to peers that may work in a distributive manner. In contrast to the centralized VoIP systems, the P2P VoIP service may reduce costs, may attain scalability, and may enhance resilience without comprising services provided to subscribers.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 12 and 13, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a first optical network terminal, the method comprising:
receiving, by the first optical network terminal, a call from a second optical network terminal;
determining, by the first optical network terminal, whether a number associated with the call is correct;
notifying, by the first optical network terminal, the second optical network terminal of a connection failure when the number associated with the call is incorrect;
accepting, by the first optical network terminal, the call when the number associated with the call is correct;
establishing, by the first optical network terminal, a connection with the second optical network terminal when the call is accepted; and
exchanging, by the first optical network terminal, voice data, associated with the call, with the second optical network terminal via the connection.

2. The method of claim 1, further comprising:
determining, based on preferences, whether to accept the call; and
accepting the call when the preferences indicate that the call is to be accepted.

3. The method of claim 1, further comprising:
recording information associated with the call; and
providing the information associated with the call to a server when the call is completed.

4. The method of claim 1, further comprising:
storing a network location of the second optical network terminal in a cache of the first optical network terminal.

5. An optical network terminal, comprising:
a memory to store a plurality of instructions; and
a processor to execute the plurality of instructions in the memory to:
receive, from a user device associated with the optical network terminal, a call to a called party,
determine whether a cache of the optical network terminal includes a network location of another optical network terminal associated with the called party,
establish, when the cache includes the network location, a connection with the other optical network terminal based on the network location,
exchange voice data, associated with the call, with the other optical network terminal via the connection,
receive another call from the other optical network terminal,
determine whether a number associated with the other call is correct,
notify the other optical network terminal of a connection failure when the number associated with the other call is incorrect,
accept the other call when the number associated with the other call is determined to be correct,
establish another connection with the other optical network terminal when the other call is accepted, and
exchange voice data, associated with the other call, with the other optical network terminal via the other connection.

6. The optical network terminal of claim 5, where the processor is further to execute instructions in the memory to:
retrieve, from the cache, the network location of the other optical network terminal when the cache includes the network location.

7. The optical network terminal of claim 5, where the processor is further to execute instructions in the memory to:
record information associated with the call, and
provide the information associated with the call to a server when the call is completed.

8. The optical network terminal of claim 5, where the processor is further to execute instructions in the memory to:
store, in the cache, the network location of the other optical network terminal.

9. The optical network terminal of claim 5, where the processor is further to execute instructions in the memory to:
determine, based on preferences, whether to accept the other call, and
accept the other call when the preferences indicate that the other call is to be accepted.

10. The optical network terminal of claim 5, where the processor is further to execute instructions in the memory to:
record information associated with the other call; and
provide the information associated with the call to a server when the other call is completed.

11. The optical network terminal of claim 5, where the processor is further to execute instructions in the memory to:
retrieve subscriber account information from a set-top box or a set-top box replacer (STBR) device associated with the optical network terminal, and
provide the subscriber account information to the user device.

12. The optical network terminal of claim 5, where the call to the called party corresponds to a first call,
where the other call from the other optical network terminal corresponds to a second call, and
where the processor is further to execute instructions in the memory to:
receive a third call from the other optical network terminal,
provide a voice mail greeting to a caller associated with the third call when a subscriber associated with the optical network terminal is unavailable,
record a voice message from the caller after provide the voice mail greeting, and
provide the recorded voice message to a set-top box or a set-top box replacer (STBR) device associated with the optical network terminal.

13. The optical network terminal of claim 12, where the processor is further to execute instructions in the memory to:
send a notification of the recorded voice message to the user device.

14. The optical network terminal of claim 13, where the processor is further to execute instructions in the memory to:

receive, from the user device, a request to retrieve the recorded voice message, and provide the recorded voice message to the user device based on the request.

15. The optical network terminal of claim 5, where the call to the called party corresponds to a first call, where the other call from the other optical network terminal corresponds to a second call, and where the processor is further to execute instructions in the memory to:

store, in the cache, an address book of a subscriber associated with the optical network terminal, receive a third call, retrieve, from the address book, information about a caller associated with the third call, and provide the retrieved information to the user device.

16. The optical network terminal of claim 15, where the processor is further to execute instructions in the memory to:

select, from the address book, a ring tone for the third call, provide the selected ring tone to the user device, select, from the address book, a ringback tone corresponding to the caller associated with the third call, and provide the selected ringback tone to the caller associated with the third call.

17. The optical network terminal of claim 5, where the call to the called party corresponds to a first call, where the other call from the other optical network terminal corresponds to a second call, and where the processor is further to execute instructions in the memory to:

receive a third call from the user device, identify the third call as an emergency call, connect to an emergency call handler associated with the optical network terminal, and provide the emergency call to the emergency call handler for forwarding to an appropriate emergency service.

18. The optical network terminal of claim 5, where the processor is further to execute instructions in the memory to:

receive a lawful intercept request from an optical network terminal (ONT) initiation and configuration manager (OICM) device, capture information associated with a particular call received by or provided from the optical network terminal, and forward the captured information to the OICM device for forwarding to a law enforcement agency that issued the lawful intercept request.

19. A non-transitory computer-readable medium comprising:

a plurality of instructions which, when executed by a first optical network terminal, cause the first optical network terminal to:

receive a call from a second optical network terminal;

determine whether a number associated with the call is correct;

notify the second optical network terminal of a connection failure when the number associated with the call is incorrect;

accept the call when the number associated with the call is correct;

establish a connection with the second optical network terminal when the call is accepted; and exchange voice data, associated with the call, with the second optical network terminal via the connection.

20. The non-transitory computer-readable medium of claim 19, further comprising:

one or more instructions to determine, based on preferences, whether to accept the call; and one or more instructions to accept the call when the preferences indicate that the call is to be accepted.

21. The non-transitory computer-readable medium of claim 19, further comprising:

one or more instructions to record information associated with the call; and one or more instructions to provide the recorded information associated with the call to a server when the call is completed.

22. The non-transitory computer-readable medium of claim 19, further comprising:

one or more instructions to receive, from a user device associated with the first optical network terminal, another call to a called party associated with the second optical network terminal, one or more instructions to determine whether a cache of the first optical network terminal includes a network location of the second optical network terminal, one or more instructions to establish, when the cache includes the network location, another connection with the second optical network terminal based on the network location, and one or more instructions to exchange voice data, associated with the other call, with the second optical network terminal via the other connection.

23. The non-transitory computer-readable medium of claim 19, further comprising:

one or more instructions to receive a lawful intercept request from an optical network terminal (ONT) initiation and configuration manager (OICM) device;

one or more instructions to capture information associated with a particular call received by or provided from the first optical network terminal; and one or more instructions to forward the captured information to the OICM device for forwarding to a law enforcement agency that issued the lawful intercept request.

* * * * *